United States Patent
Ogiura et al.

(10) Patent No.: US 6,744,181 B1
(45) Date of Patent: *Jun. 1, 2004

(54) ACCELERATION SENSOR

(75) Inventors: Mitsugu Ogiura, Toyama (JP); Jun Tabota, Toyama-ken (JP)

(73) Assignee: Murata Manufacturing Co., Ltd, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 641 days.

(21) Appl. No.: 08/909,590

(22) Filed: Aug. 12, 1997

(30) Foreign Application Priority Data

Aug. 13, 1996 (JP) .............................................. 8-213889

(51) Int. Cl.[7] ................................................. H01L 1/00
(52) U.S. Cl. ...................... 310/357; 310/329; 310/330; 310/331; 310/332
(58) Field of Search ................................ 310/329–332, 310/358, 359, 366, 321

(56) References Cited

U.S. PATENT DOCUMENTS

| | | | | |
|---|---|---|---|---|
| 3,397,329 A | | 8/1968 | Riedel ........................ 310/329 |
| 4,431,935 A | * | 2/1984 | Rider ....................... 310/329 X |
| 4,499,394 A | * | 2/1985 | Koal ........................ 310/358 X |
| 4,670,682 A | * | 6/1987 | Harnden, Jr. et al. ... 310/358 X |
| 5,083,056 A | * | 1/1992 | Kondou et al. .............. 310/332 |
| 5,233,256 A | * | 8/1993 | Hayashi et al. .............. 310/332 |
| 5,515,725 A | * | 5/1996 | Tabota et al. ........... 310/321 X |
| 5,763,982 A | * | 6/1998 | Tabota et al. ................ 310/329 |

FOREIGN PATENT DOCUMENTS

| | | |
|---|---|---|
| DE | 1523205 | 11/1966 |
| EP | 0616221 | 3/1994 |
| EP | 0616222 | 9/1994 |
| JP | 07260819 | 10/1995 |

OTHER PUBLICATIONS

Two–End Clamp Structure Enhances Characteristics in SMD Shock Sensors, by Jun Tabota. IEE, Aug. 1994.*

* cited by examiner

*Primary Examiner*—Mark O. Budd
(74) *Attorney, Agent, or Firm*—Keating & Bennett, LLP

(57) ABSTRACT

A piezoelectric type acceleration sensor which is small in size and has a high charge sensitivity and large static capacitance includes a piezoelectric element having a laminate of more than three piezoelectric layers. Electrodes are provided between the piezoelectric layers and the top and bottom surfaces of the laminate. The piezoelectric element is supported at opposed ends. Adjacent ones of the piezoelectric layers are polarized so that charge having the same polarity is accumulated at the electrode interposed the adjacent ones.

8 Claims, 7 Drawing Sheets

ACCELERATION SENSOR

BACKGROUND OF THE INVENTION

1. Field of the Invention

The present invention relates to an acceleration sensor having a piezoelectric element, and more particularly to an acceleration sensor used for an air bag installed in a vehicle.

2. Description of the Related Art

An acceleration sensor employing a piezoelectric element has been used for an air bag installed in an automobile in order to detect an acceleration caused by an impact. Acceleration sensors having various kind of structures have been proposed for this application, and an acceleration sensor using a bimorph type piezoelectric element has been known as a high sensitivity type as disclosed in Japanese Patent Laid-open Publication Nos. 6-273439, 6-324073, etc.

As shown in FIG. 1, a conventional acceleration sensor 1 using a bimorph type piezoelectric element has a bimorph type piezoelectric element 2 and insulating case 3. The acceleration sensor 1 is mounted on a substrate 4.

The bimorph type piezoelectric element 2 has a structure in which a first piezoelectric ceramic plate 5 and a second piezoelectric ceramic plate 6 are laminated. A first signal electrode 7 and a second signal electrode 8 are formed on outer main faces of the first piezoelectric ceramic plate 5 and the second piezoelectric plate 6, respectively. The first signal electrode 7 and the second signal electrode 8 overlap through the piezoelectric ceramic plates 5 and 6 in the central portion along the longitudinal direction of the piezoelectric element 2. An intermediate electrode 9 is formed between the first piezoelectric ceramic plate 5 and the second piezoelectric ceramic plate 6 such that the intermediate electrode 9 is located between the overlap portions of the first signal electrode 7 and the second signal electrode 8.

The first piezoelectric ceramic plate 5 and the second piezoelectric ceramic plate 6 are uniformly polarized in opposing directions with respect to each other. The first signal electrode 7 extends toward one of two opposing ends of the piezoelectric element 2 along the longitudinal direction thereof while the second signal electrode 8 extends towards the other end of the piezoelectric element 2 along the longitudinal direction thereof.

The insulating case 3 comprises a first clip portion 10, a second clip portion 11, and substrates 12 and 13. The clip portions 10 and 11 have recesses 10a and 11a, respectively and clip the piezoelectric element 2 at the both ends of the longitudinal direction thereof, thereby holding the piezoelectric element 2 at the both ends of the longitudinal direction thereof while allowing the piezoelectric element 2 to vibrate. The substrates 12 and 13 have a recess 12a and a recess (not shown), respectively and clip the piezoelectric element 2 in a direction perpendicular to a direction in which the clip portions 10 and 11 are faced.

The bimorph type piezoelectric element 2 has a good sensitivity to an acceleration along the thickness direction of the piezoelectric element 2 and no sensitivity against an acceleration along the direction indicated by an arrow Q.

Although the bimorph type piezoelectric element 2 outputs a reasonable sensing potential, the sensing charge is small due to a small static capacitance of the bimorph type piezoelectric element 2. Therefore, when the sensing output is amplified using a charge amplifier, the signal to noise (SN) ratio degrades.

Moreover, there arises a problem that a low frequency component of the signal detected by the bimorph type piezoelectric element 2 cannot be measured since a high pass filter created between the charge amplifier and the bimorph type piezoelectric element 2 has a high cutoff frequency at a lower frequency side. In the case where the impedance of the charge amplifier is increased so as to measure a low frequency component, the noise on the detected signal might be such increased that the SN ratio degrades.

It is possible to increase the static capacitance by making the piezoelectric element 2 thinner in thickness or larger in width. However, in the case of making the piezoelectric element 2 larger in width, this results in the acceleration sensor having a large size, which would be adverse to the commercial demand. On the other hand, in the case of making the piezoelectric element 2 thinner, the mechanical strength of the piezoelectric element 2 degrades, which may decrease the production yield and increase the possibility of destruction due to a large acceleration.

For the foregoing reasons, there is a need for an acceleration sensor which has a high charge sensitivity and a large static capacitance as well as a small size and an appropriate mechanical strength.

SUMMARY OF THE INVENTION

The present invention provide an acceleration sensor that satisfies this need. The acceleration sensor comprises a piezoelectric element having at least three piezoelectric layers, a plurality of first electrodes and a plurality of second electrodes. The piezoelectric layers are stacked with each other in a thickness direction so as to form a laminate having first and second opposed ends in a lengthwise direction thereof. The first and second electrodes are provided alternately between the piezoelectric layers and on top and bottom surfaces of the laminate such that the first electrodes extend from the first end toward the second end and the second electrodes extend from the second end toward the first end and partially overlap with each other via the piezoelectric layers. The acceleration sensor further comprises a support for holding the piezoelectric element at the vicinity of the first and second ends of the laminate. The piezoelectric layers are polarized in the thickness direction such that charges having opposite polarities are accumulated at the first and second electrodes, respectively, when the piezoelectric element receives an impact caused by an acceleration.

The piezoelectric layers may be polarized at the region where the first and second electrodes overlap.

In one embodiment, at least one of the stacked piezoelectric layers is not polarized.

In another embodiment, the piezoelectric element has an even number of the piezoelectric layers, greater than three, adjacent ones of the piezoelectric layers, except a pair of the piezoelectric layers which are located at the middle of the laminate, are polarized in opposite directions with each other and the pair of piezoelectric layers are polarized in the same direction.

In accordance with another embodiment, the piezoelectric element has an odd number, greater than two, of piezoelectric layers, all of the piezoelectric layers, except one located at the middle of said piezoelectric element, being polarized.

In accordance with another embodiment, the acceleration sensor includes a substrate upon which the support is mounted, the support holding the laminate at an angle of 90° with respect to the substrate. Advantageously, the angle is between 0° and 90° and, preferably, it is equal to or less than 45°.

According to the preferred embodiments of the invention, positive and negative charges induced in each of the piezoelectric layers are effectively accumulated at the first electrodes and the second electrodes without cancellation. This structure also provides the acceleration sensor with a large static capacitance. Therefore, piezoelectric type acceleration sensor which has a high charge sensitivity, detects an acceleration having a low frequency component and is small in size can be realized.

These and other features, aspects, and advantages of the present invention will become better understood with reference to the following detailed description in conjunction with the accompanying drawings.

DETAILED DESCRIPTION OF THE PREFERRED EMBODIMENTS

Hereinafter, the preferred embodiments of the present invention are explained in detail with reference to the drawings.

First Embodiment

Figure 1:
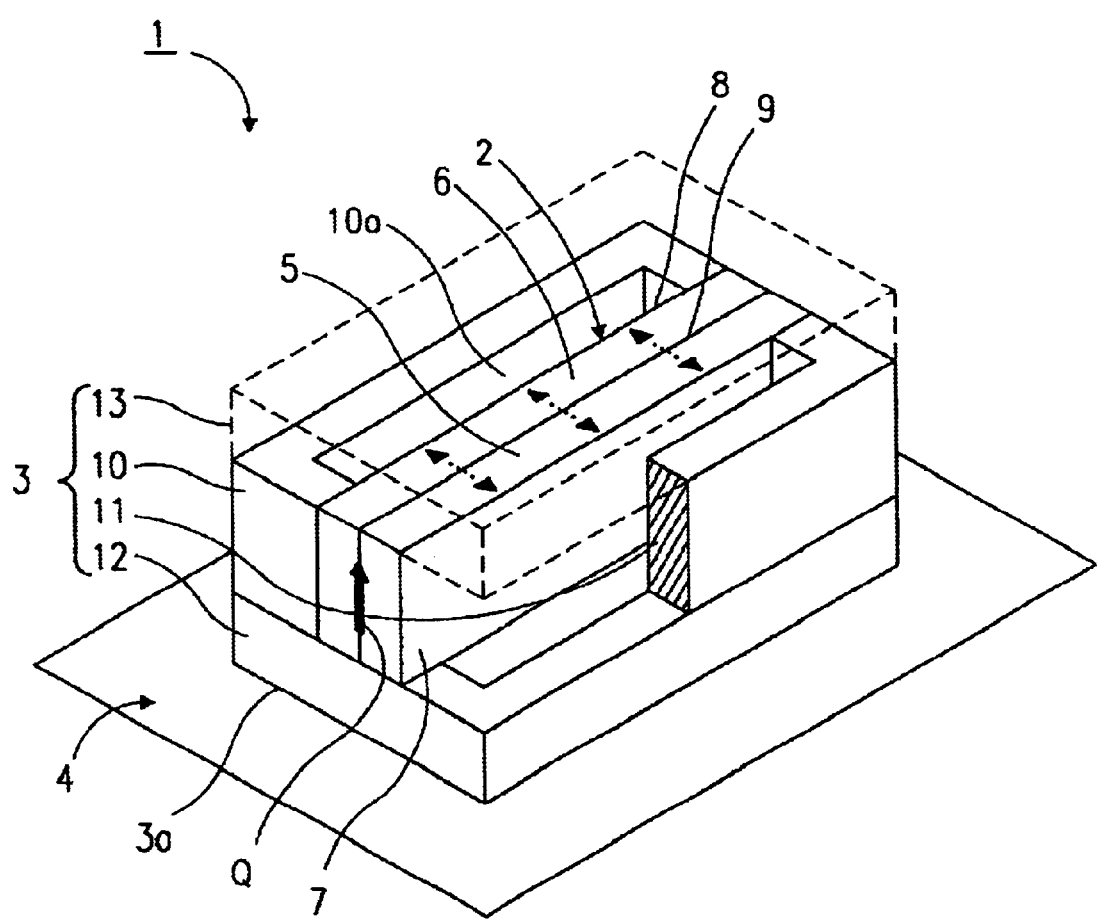
FIG. 1 is a perspective view of a conventional acceleration sensor.
Figure 2:
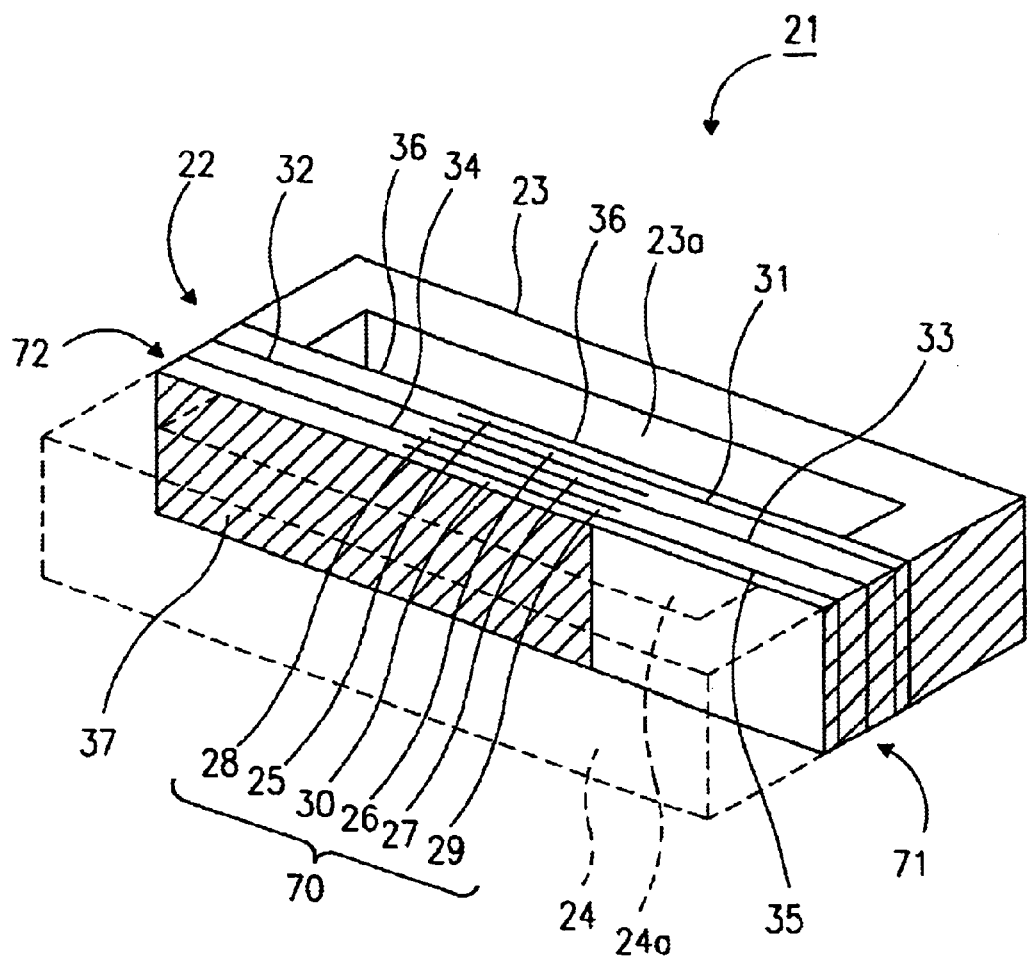
FIG. 2 is a perspective view of an acceleration sensor according to a first embodiment of the present invention.
Figure 3:
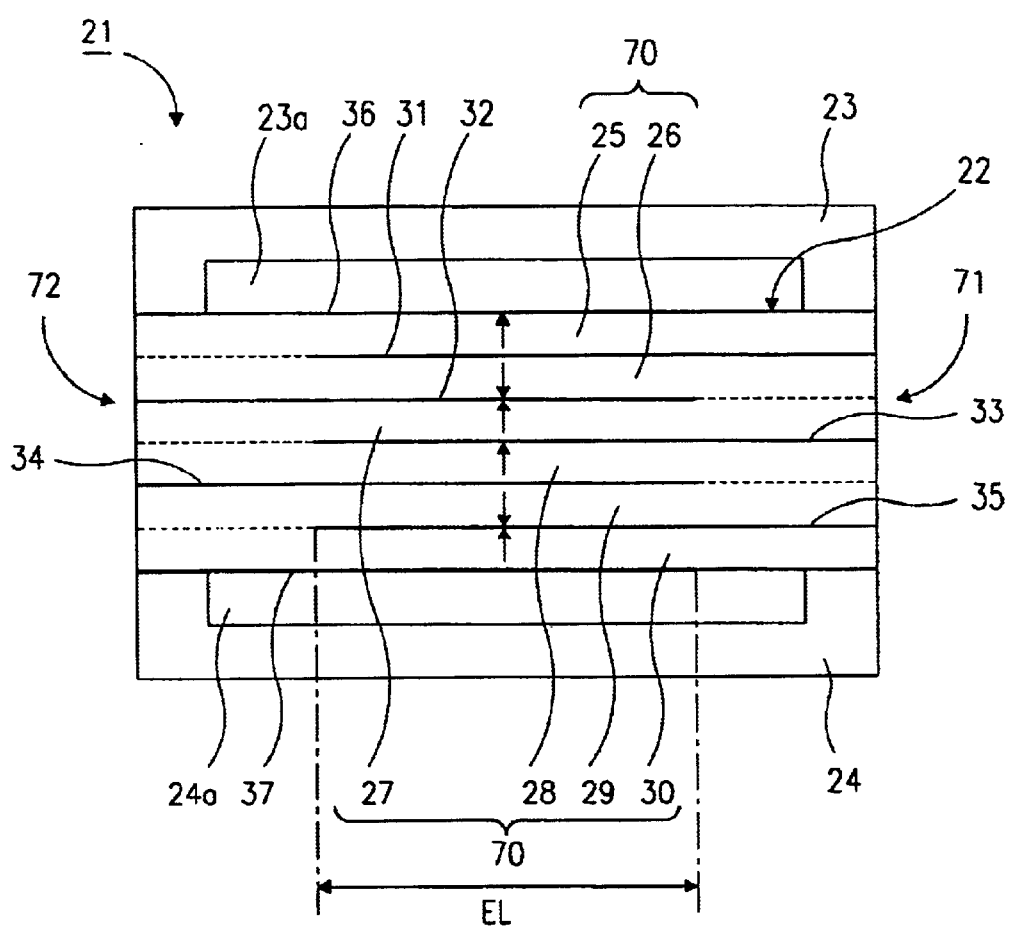
FIG. 3 is a schematic plan view explaining a polarizing direction of an piezoelectric element in the acceleration sensor shown in FIG. 2.

FIG. 2 is a perspective view showing an acceleration sensor 21 according to an embodiment of the present invention, and FIG. 3 is a plan view thereof. The acceleration sensor 21 comprises a piezoelectric element 22 and supports 23 and 24 (the support 24 being shown with phantom lines for clarity).

The piezoelectric element 22 has a laminate 70, first electrodes 31, 33 and 35 and second electrodes 32, 34, 36 and 37. The laminate 70 is formed by stacking piezoelectric layers 25–30 and has a first end 71 and a second opposed end 72.

The supports 23 and 24 have recesses 23a and 24a, respectively, such that pairs of protrusions are provided at both sides of the recesses 23a and 24a, respectively. The protrusions of the supports 23 and 24 are attached to the vicinity of the ends 71 and 72 of the laminate 70, whereby the laminate 70 is held by the supports 23 and 24. The supports 23 and 24 may be formed of an insulating material, such as insulating ceramics (alumina or the like), synthetic resin, etc.

As best shown in FIG. 3, the first electrodes 31, 33 and 35 and the second electrodes 32, 34, 36 and 37 are provided alternately between the piezoelectric layers 25–30 and on the top and bottom surfaces of the laminate 70. The first electrodes 31, 33 and 35 extend from the first end 71 toward the second end 72 and the second electrodes 32, 34, 36 and 37 extend from the second end 72 toward the first end 71. Moreover, the first electrodes 31, 33 and 35 and the second electrodes 32, 34, 36 and 37 overlap partially with each other in the region denoted as EL via the piezoelectric layers 25–30.

In this embodiment, the first electrodes 31, 33 and 35, the second electrodes 32, 34, 36 and 37 and the piezoelectric layers 25–30 are integrated as a sintered structure by using a ceramic integrated sintering technique. In the case, it is easy to reduce the thickness of the piezoelectric layers 25–30, which enables increase of the static capacitance of the piezoelectric layers 25–30. Alternatively, piezoelectric layers 25–30 may be adhered with the first electrodes 31, 33 and 35 and the second electrodes 32, 34, 36 and 37 after respective sintering of the piezoelectric layers 25–30.

The piezoelectric layers 25–30 are formed of piezoelectric ceramics such as lead titanate zirconate or piezoelectric single crystalline such as quartz, $LiTaO_3$, or the like. The first electrodes 31, 33 and 35 and the second electrodes 32, 34, 36 and 37 are formed of a metallic material superior in electric conductivity such as Ag, Ag—Pd or the like.

As shown in FIG. 3, all of the piezoelectric layers 25–30 are polarized along a thickness direction thereof, but a polarized direction of the piezoelectric layers 25, 27, 28 and 30 are opposed to that of the piezoelectric layers 26 and 29. The polarization direction of each of the piezoelectric layers 25–30 is determined so that charges having opposite polarities are accumulated at the first and second electrodes, respectively, when the piezoelectric element 22 receives an impact caused by an acceleration. The piezoelectric layers 25–30 can be polarized at once by applying a high voltage with the second electrodes 36 and 32, a medium voltage with the first electrodes 31, 33 and 35 and a low voltage with the second electrode 34 and 37. Alternatively, the piezoelectric layers 25–30 can be polarized, for example, by first applying a high voltage with the second electrodes 36 and 32 and a low voltage with the first electrodes 31 and 33 and then by applying a high voltage with the first electrodes 33 and 35 and a low voltage with the second electrodes 34 and 37.

Figure 4:
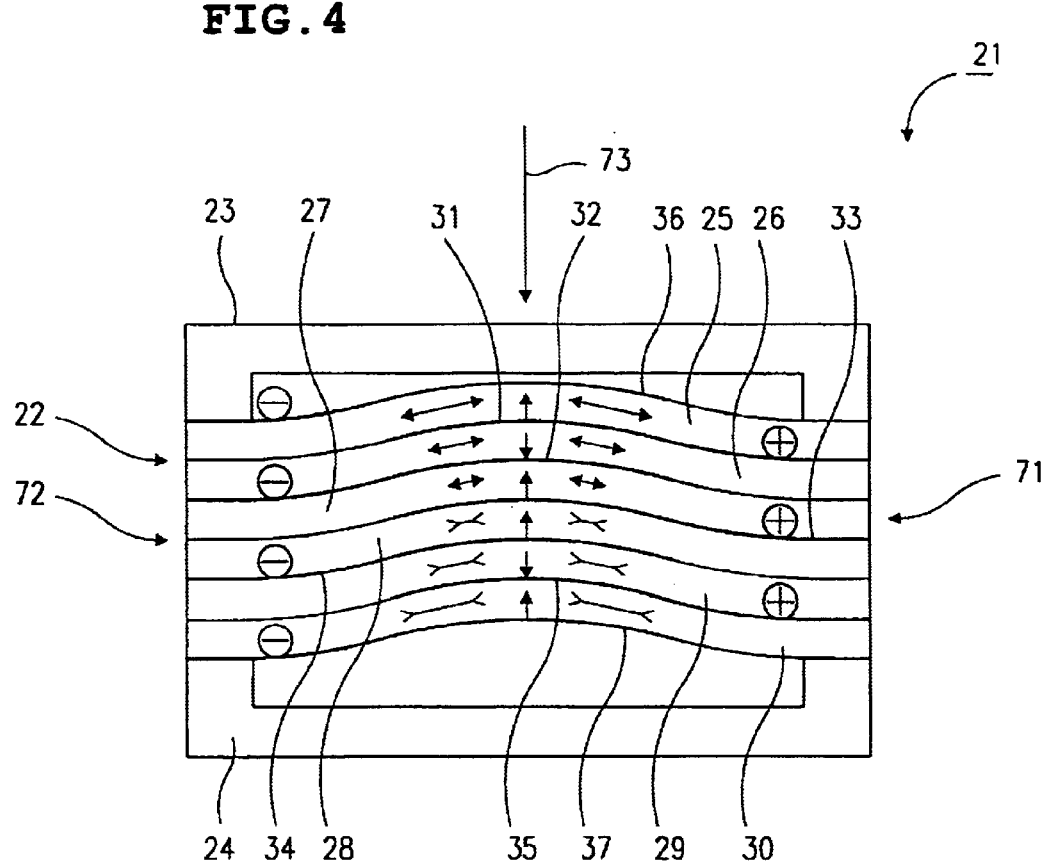
FIG. 4 is a schematic plan view explaining the stresses and charges caused in the piezoelectric element in the acceleration sensor shown in FIG. 2.

The operation of the acceleration sensor 21 will be explained in detail with reference to FIG. 4. FIG. 4 shows a schematic plan view explaining the stresses and charges generated in the piezoelectric element 22 of the acceleration sensor 21. As shown in FIG. 4, when the acceleration sensor 21 receives an acceleration caused by an impact 73, the piezoelectric element 22 is deformed such that the center of each of the piezoelectric layers 25–30 protrudes toward the support 23 due to the reaction against the impact 73. As a result, the piezoelectric layers 25–27 are expanded, and a tensile stress as indicated by the arrows pointing outward is caused in the piezoelectric layers 25–27. On the other hand, the piezoelectric layers 28–30 are contracted, and a compressive stress as indicated by the arrows pointing inward is caused in the piezoelectric layers 28–30.

Assume that the relationship between the polarization direction of the piezoelectric layer 25 and the direction of the stress caused therein is such that a negative charge is induced on the surface of the piezoelectric layer 25 which is in contact with the second electrode 36 and a positive charge is induced on the surface of the piezoelectric layer 25 which is in contact with the first electrode 31. This results in a negative charge and a positive charge being accumulated at the second electrode 36 and the first electrode 31, respectively. In this case, since the piezoelectric layer 26 is polarized in an opposite direction to that of the piezoelectric layer 25, the positive charge is induced on the surface of the piezoelectric layer 26 which is in contact with the first electrode 31. That is, since the piezoelectric layers 25 and 26 are polarized such that the polarization directions of the piezoelectric layers 25 and 26 are directed away from the first electrode 31, the same polarity of charge (positive charge in this case) is accumulated on the first electrode 31 by the piezoelectric layers 25 and 26.

In the same way, the piezoelectric layers 26 and 27 by which the second electrode 32 is sandwiched are polarized such that the polarization directions of the piezoelectric layers 26 and 27 are directed toward the second electrode 32. Thus, negative charge derived from the piezoelectric layers 26 and 27 is accumulated at the second electrode 32.

The piezoelectric layers 28–30 are subject to contraction when the acceleration sensor 21 receives an acceleration caused by an impact 73. Therefore, the relationship between the polarization direction and polarity of the induced charge is reversed. Specifically, positive charge is accumulated at first electrode 35 which is sandwiched by the piezoelectric layers 29 and 30 having the polarization directions toward the first electrode 35, respectively. Negative charge is also accumulated at the second electrode 34 in the same way.

The first electrode 33 is sandwiched by the piezoelectric layer 27 and the piezoelectric layer 28 which are both polarized in the same direction. However, since the tensile stress and compressive stress are caused in the piezoelectric layer 27 and the piezoelectric layer 28, respectively, only the positive charge is accumulated at the first electrode 33.

Accordingly, positive and negative charges induced in each of the piezoelectric layers 25–30 by an acceleration are effectively accumulated at the first electrodes 31, 33 and 35 and the second electrodes 32, 34, 36 and 37 without cancellation. Therefore, the charge sensitivity of the acceleration sensor 21 can be enhanced.

As can be understood from the aforementioned explanation, it is preferable that the acceleration sensor has as many piezoelectric layers as possible so that the accumulated charge in the piezoelectric element 22 is increased. In addition, it is preferable that the tensile stress and the compressive stress are balanced in the piezoelectric element 22. The number of the piezoelectric layers, therefore, is preferably an even number greater than three. In this case, a pair of piezoelectric layers which are located at the middle of the laminate are polarized in the same direction, and other piezoelectric layers are polarized in directions opposite to those of adjacent ones. It is further preferable that the piezoelectric layers are as thin as possible since the static capacitance thereof increase.

Although each of the piezoelectric layers is polarized uniformly and entirely, only the region EL (FIG. 3) where the first and second electrodes overlap may be polarized. Moreover, an output voltage across the first and second electrodes increases as the region EL decreases in the lengthwise direction. Static capacitance has a trade-off relationship with the output voltage. Therefore, an acceleration sensor having the characteristics for the specific application can be produced by adjusting the length of the region EL in the lengthwise direction.

Figure 5:
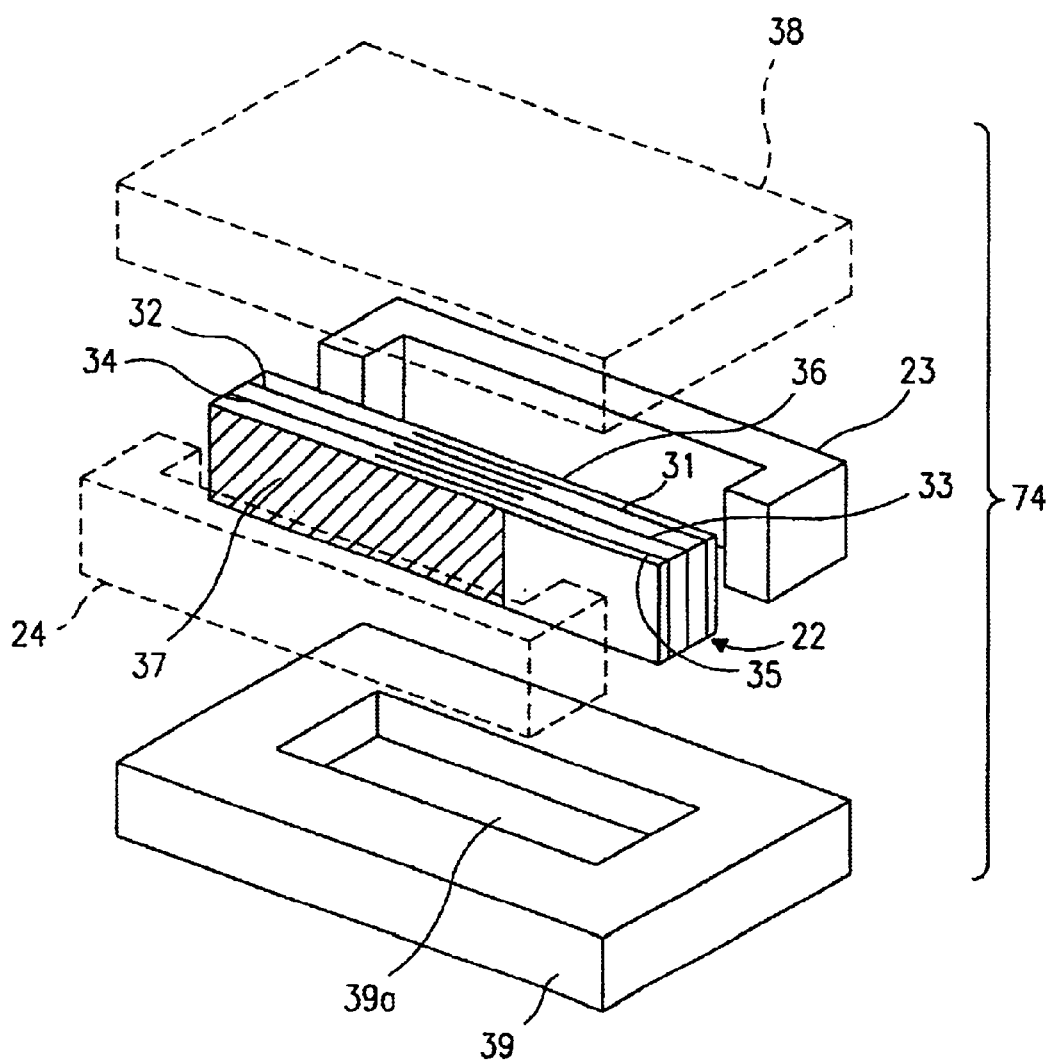
FIG. 5 is an exploded perspective view of the acceleration sensor of FIG. 2 incorporated with substrates.

The acceleration sensor according to the embodiment may be incorporated with substrates in order that the piezoelectric element is held in a casing. As shown in FIG. 5, an acceleration sensor 74 comprises the piezoelectric element 22, the supports 23 and 24 and substrates 38 and 39. The piezoelectric element 22 and the supports 23 and 24 are constructed as the acceleration sensor 21 shown in FIG. 2, and the piezoelectric element 22 is sandwiched by the substrates 38 and 39 in a direction perpendicular to the direction in which the supports 23 and 24 face each other. A recess (not shown) and a recess 39a are formed on the inner surface of the substrates 38 and 39, respectively, so as to secure a free space for the displacement of the piezoelectric element 22. The substrates 23 and 24 may be formed by an insulating material.

Second Embodiment

Figure 6:
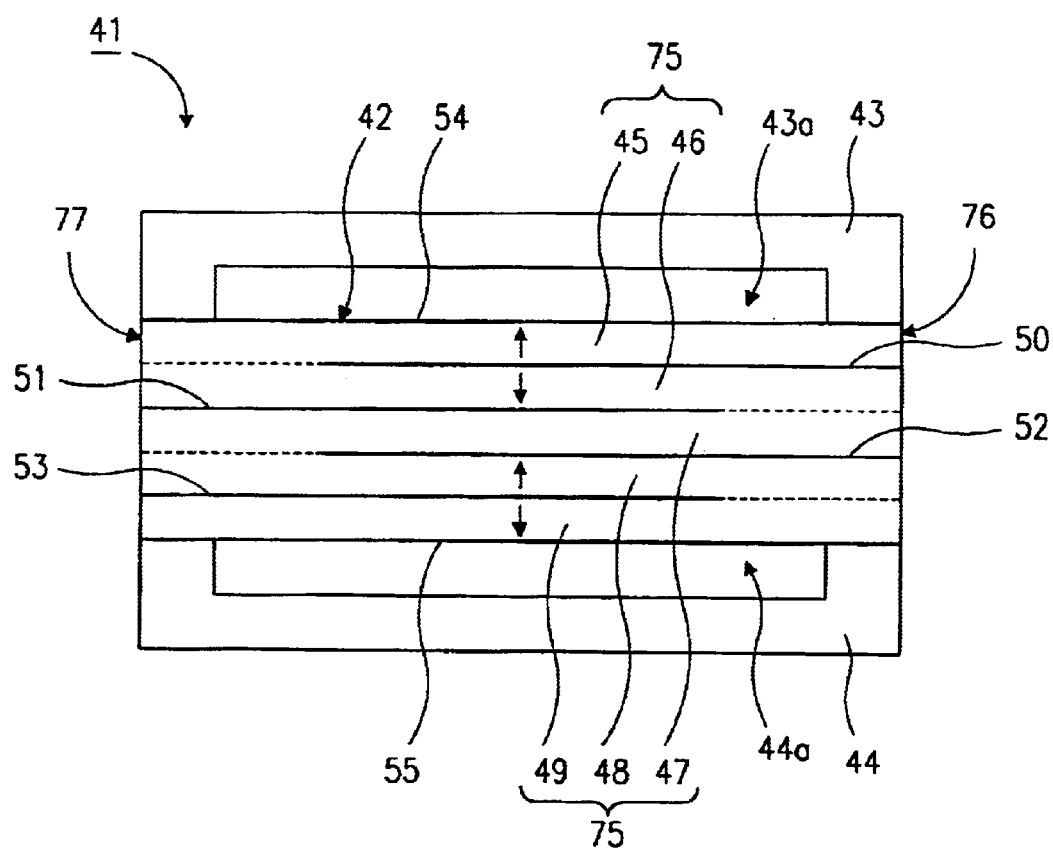
FIG. 6 is a schematic plan view of an acceleration sensor according to a second embodiment of the present invention.

FIG. 6 is a plan view showing an acceleration sensor 41 according to another embodiment of the present invention. The acceleration sensor 41 shown in FIG. 6 is different from the acceleration sensor 21 shown in FIG. 2 in the number of piezoelectric layers and the polarization direction of the piezoelectric layers.

The acceleration sensor 41 comprises a piezoelectric element 42 and supports 43 and 44. The piezoelectric element 42 has a laminate 75, first electrodes 50, 52 and 55 and second electrodes 51, 53 and 54. The laminate 75 is formed by stacking piezoelectric layers 45–49 and has a first end 76 and a second opposed end 77.

The supports 43 and 44 have recesses 43a and 44a, respectively, such that a pair of protrusions are provided at both sides of the recesses 43a and 44a, respectively. The protrusions of the supports 43 and 44 are attached to the vicinity of the ends 76 and 77 of the laminate 75, whereby the laminate 75 is held by the supports 43 and 44. The supports 43 and 44 may be formed of an insulating material, such as insulating ceramics (alumina or the like), synthetic resin, etc. The acceleration sensor 41 may be incorporated with substrates as explained in the first embodiment so as to hold the piezoelectric element 42 in a casing.

The first electrodes 50, 52 and 55 and the second electrodes 51, 53 and 54 are provided alternately between said piezoelectric layers 45–49 and on the top and bottom surfaces of the laminate 75. The first electrodes 50, 52 and 55 extend from the first end 76 toward the second end 77 and the second electrodes 51, 53 and 54 extend from the second end 77 toward the first end 76. Moreover, the first electrodes 50, 52 and 55 and the second electrodes 51, 53 and 54 overlap partially with each other via the piezoelectric layers 45–49.

The first electrodes 50, 52 and 55 and the second electrodes 51, 53 and 54 and the piezoelectric layers 45–49 may be integrated as a sintered structure by using a ceramic integrated sintering technique. Alternatively, the piezoelectric layers 45–49 may be adhered with the first electrodes 50, 52 and 55 and the second electrodes 51, 53 and 54 after respective sintering of the piezoelectric layers 45–49. The piezoelectric layers 45–49, the first electrodes 50, 52 and 55 and the second electrodes 51, 53 and 54 may be formed of the same material as explained in the first embodiment.

As indicated by the arrows in FIG. 6, the piezoelectric layers 45, 46, 48 and 49 are polarized along a thickness direction thereof while the piezoelectric layer 47 which is located at the middle of the laminate 75 is not polarized. The polarization direction of the piezoelectric layers 45 and 48 are opposed to that of the piezoelectric layers 46 and 49. The polarization directions of the piezoelectric layers 45, 46, 48 and 49 are determined so that charges having opposite polarities are accumulated at the first and second electrodes, respectively, when the piezoelectric element 42 receives an impact caused by an acceleration.

Figure 7:
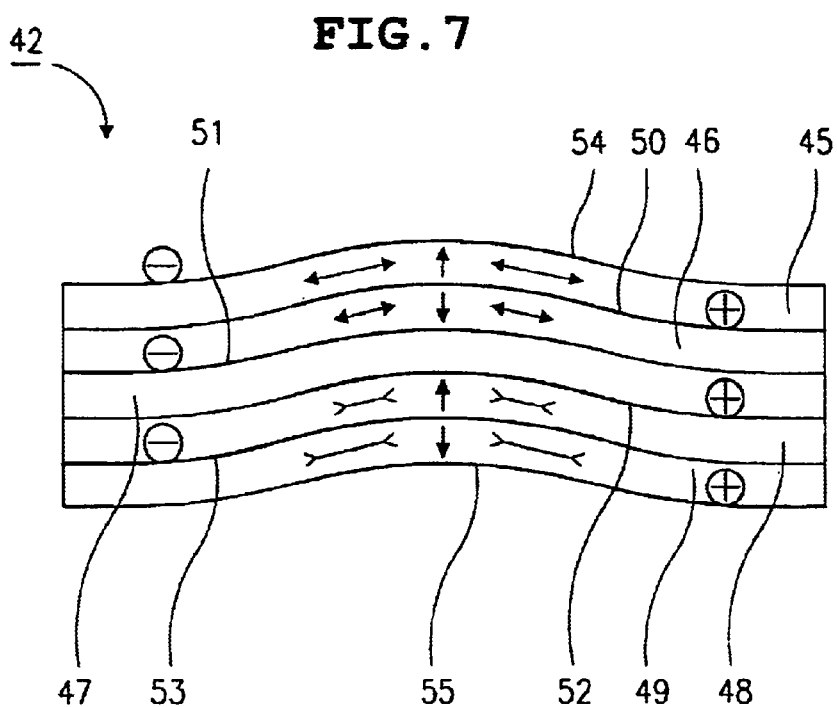
FIG. 7 is a schematic plan view explaining the stresses and charges caused in the piezoelectric element in the acceleration sensor shown in FIG. 6.

FIG. 7 shows a schematic plan view explaining the stresses and charges caused in the piezoelectric element 42 of the acceleration sensor 41. As shown in FIG. 7, when the piezoelectric element 42 is deformed such that the center of each of the piezoelectric layers 45–49 protrudes toward an upper side due to an impact, the piezoelectric layers 45 and 46 are expanded, and a tensile stress as indicated by the arrows pointing outward is caused in the piezoelectric layers 45 and 46. On the other hand, the piezoelectric layers 48 and 49 are contracted, and a compressive stress as indicated by the arrows pointing inward is caused in the piezoelectric layers 48 and 49. Note that the piezoelectric layer 47 does not generate charges due to the fact that the piezoelectric layer 47 is not polarized.

As explained in detail in the first embodiment, since the piezoelectric layers 45 and 46 are polarized in the opposite directions, charges having the same polarity are induced on the surfaces of the piezoelectric layers 45 and 46 which are in contact with the first electrode 50. Thus, charges having the same polarity are accumulated at the first electrode 50 without cancellation of the charge. In the case shown in FIG. 7, positive charge is accumulated on the first electrode 50 while negative charge is accumulated at the second electrodes 51 and 54.

The piezoelectric layers 48 and 49 are subject to contraction. Therefore, the relationship between the polarization direction and polarity of the induced charge is reversed. Specifically, negative charge is accumulated at second electrode 53 which is sandwiched by the piezoelectric layers 48 and 49. Positive charge is also accumulated at the first electrodes 52 and 55.

Accordingly, positive and negative charges induced in the piezoelectric layers 45, 46, 48 and 49 by an impact are effectively accumulated at the first electrodes 50, 52, and 55 and the second electrodes 51, 53 and 54, respectively without cancellation. Therefore, the charge sensitivity of the acceleration sensor 41 can be enhanced.

Although the piezoelectric layer 47 does not generate charges as explained above, the piezoelectric layer 47 acts a buffer to relieve the tensile stress caused in the piezoelectric layers 45 and 46 and the compressive stress caused in the piezoelectric layers 48 and 49. The piezoelectric layer 47 also contributes to an increase in the static capacitance of the piezoelectric element 42. In addition, according to this structure, the piezoelectric layers 45, 46, 48 and 49 can be polarized at once by using two kind of voltages, for example, by applying a low voltage with the first electrode 50 and the second electrode 53 and a high voltage with the first electrodes 52 and 55 and the second electrodes 51 and 54. Therefore, the polarizing process can be simplified.

In the piezoelectric element 42, it is preferable that the tensile stress and the compressive stress are balanced and that the number of non-polarized layers is minimized so that the piezoelectric element 42 has a good charge sensitivity. Therefore, the number of the piezoelectric layers is preferably an odd number greater than two, and one piezoelectric layer located at the middle of the laminate is not polarized.

Modification

In the acceleration sensors 21 and 41, the piezoelectric elements 22 and 42 are supported by the supports such that the stacking direction of the piezoelectric layers is parallel to a main surface of the acceleration sensors 21 and 41. Since the piezoelectric elements 22 and 42 have a maximum sensitivity in the stacking direction and have no sensitivity perpendicular to the stacking direction, the acceleration sensors 21 and 41 have no sensitivity in a direction perpendicular to the main surface.

Figure 8:
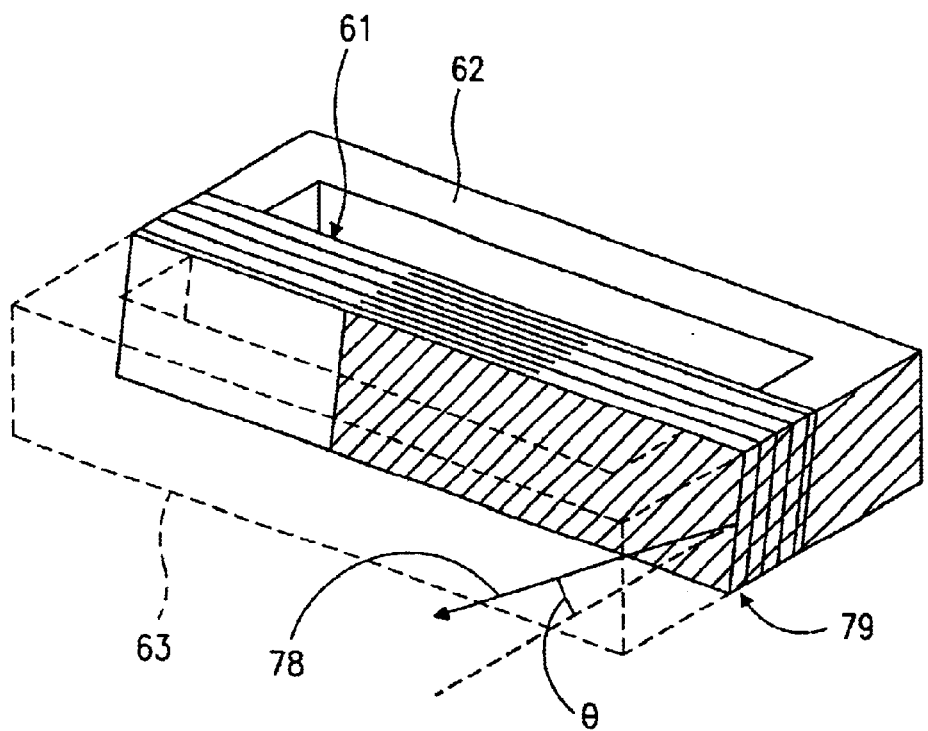
FIG. 8 is a perspective view showing a variation of the acceleration sensor shown in FIG. 2 or FIG. 6.

In order to detect an acceleration perpendicular to the main surface, the stacking direction of the piezoelectric layers may be tilted. As shown in FIG. 8, a piezoelectric element 61 having the same structure as the piezoelectric element 21 or 41 is held by the supports 62 and 63 such that the stacking direction 78 of the piezoelectric layers is tilted by an angle θ with respect to a main surface 79. As a result, a maximum sensitivity axis of the piezoelectric element 61 is tilted by the angle θ with respect to the main surface 79. The angle θ can be set at an arbitrary value greater than 0 degree and less than 90 degrees, but it is preferable to set the angle θ equal to or less than 45 degrees. The optimal angle is 45 degrees.

As has been explained in detail, the piezoelectric element of the acceleration sensor according to the present invention has more than three stacked piezoelectric layers, and adjacent piezoelectric layers are polarized so that charge having the same polarity is accumulated at the electrode interposed between the adjacent piezoelectric layers. The structure provides the acceleration sensor with a high charge sensitivity and a large static capacitance. Therefore, a piezoelectric type acceleration sensor which detects an acceleration having a low frequency component and is small in size can be realized.

Moreover, the piezoelectric element can have great mechanical strength as the static capacitance of the piezoelectric element can be increased without making the piezoelectric layers thin. In the case where the piezoelectric element is formed by a ceramic integrated sintering technique, the piezoelectric layers can be made thin without causing cracks in the piezoelectric layers during the manufacturing process. Therefore, the static capacitance can be further increased, by which an acceleration having a low frequency component can be measured readily.

When the laminate of the piezoelectric element includes a piezoelectric layer which is not polarized, the remaining piezoelectric layers of the laminate can be polarized by using two kind of voltages. This makes the manufacturing process simplified.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An acceleration sensor comprising:
   a piezoelectric element having at least three piezoelectric layers, a plurality of first electrodes and a plurality of second electrodes, said piezoelectric layers being stacked with each other in a thickness direction thereof so as to form a laminate having first and second opposed ends in a lengthwise direction thereof, said first and second electrodes being provided respectively and alternately at each interface between said piezoelectric layers and on top and bottom surfaces of said laminate such that said first electrodes extend from said second end toward but not to said first end and said second electrodes extend from said first end toward but not to said second end and partially overlap with each other via said piezoelectric layers; and
   a support for holding said piezoelectric element at the vicinity of the said first and second ends of said laminate,
   wherein said piezoelectric layers are polarized in the thickness direction thereof only at the region where the first and second electrodes overlap such that charges having opposite polarities are accumulated at said first and second electrodes, respectively, and the same polarity of charge is accumulated on at least one of said first and second electrodes by a pair of said piezoelectric layers in contact with the at least one of said first and second electrodes, when said piezoelectric element receives an impact in the thickness direction caused by an acceleration, said overlap area being selected to provide a desired output voltage and static capacitance.

2. An acceleration sensor according to claim 1, wherein said piezoelectric layers are polarized at least at the region where said first and second electrodes overlap.

3. An acceleration sensor according to claim 1, wherein at least one of said stacked piezoelectric layers is not polarized.

4. An acceleration sensor according to claim 1, wherein said piezoelectric element has an even number, greater than three, of said piezoelectric layers, adjacent ones of said piezoelectric layers, except a pair of said piezoelectric layers which are located at the middle of said laminate, being polarized in opposite directions with respect to each other, said pair of said piezoelectric layers being polarized in the same direction.

5. An acceleration sensor according to claim 1, wherein said piezoelectric element has an odd number, greater than two, of said piezoelectric layers, all of said piezoelectric layers, except one piezoelectric layer located at the middle of said piezoelectric element, being polarized.

6. An acceleration sensor according to claim 1, further including a substrate upon which said support is mounted, said support holding said laminate at an angle of 90° with respect to said substrate.

7. An acceleration sensor according to claim 6, wherein said support holds said laminate at an angle between 0° and 90°.

8. An acceleration sensor according to claim 7, wherein said support holds said laminate at an angle equal to or less than 45°.

* * * * *